Figure 1:
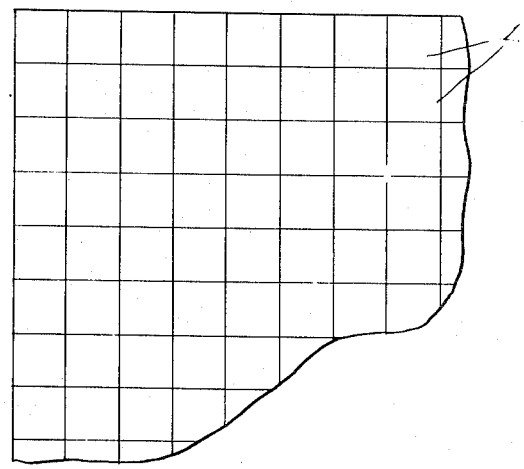

July 11, 1939.   A. ELMENDORF   2,165,788
FLEXIBLE WOOD FLOORING
Filed Oct. 29, 1937

Inventor:
Armin Elmendorf,
by Wm. F. Freudenreich,
atty.

Patented July 11, 1939

2,165,788

UNITED STATES PATENT OFFICE 2,165,788

FLEXIBLE WOOD FLOORING

Armin Elmendorf, Winnetka, Ill.

Application October 29, 1937, Serial No. 171,692

2 Claims. (Cl. 20—7)

A type of flooring that possesses many desirable and useful characteristics is that in which pieces of wood are secured upon a flexible backing which, in turn, is cemented to a subfloor. Roofing and building felts, among other fabricated sheets, can advantageously be employed as backing materials. In order to keep down the cost, the cement or adhesive between the flooring and the subfloor or other foundation, should be inexpensive. Adhesives of the water-soluble and alcohol-soluble types and those containing water or alcohol are sufficiently low in cost for the purpose and provide good, durable bonds when permitted to set under proper conditions. Subfloors to be covered, even when of concrete, trowelled smooth, require a considerable body of adhesive material to be spread over the same in order to insure a satisfactory bond with the entire area of the overlying flexible floor covering.

A plain, non-waterproof felt employed as the backing membrane for the flexible flooring does not possess the desired strength and, moreover, the moisture contained in the adhesive between the same and the underlying subfloor or foundation is absorbed so rapidly that the moisture of the bottoms of the wood tiles increases, causing objectionable cupping or warping. While other porous fabrics may be sufficiently strong, they are open to the last named objection that the tiles may cup or warp in laying the flooring. When, on the other hand, the felt or other porous material is saturated or thoroughly impregnated with a waterproofing substance as, for example, asphalt or other bituminous material, both of the aforesaid objections are overcome, but another difficulty is encountered. This happens when the flooring is bonded to a concrete floor or to a painted or varnished wood floor, using a water-soluble or an alcohol-soluble adhesive. In such cases, the water or alcohol in the adhesive cannot evaporate and permit the adhesive to set, except very slowly; the result being that a flooring may be in use for a considerable length of time before the adhesive has set. During this time the flooring is often exposed to days of high atmospheric humidity whereby the moisture content of the wood blocks is raised, causing them to expand. If, under these conditions, the flooring is not firmly bonded, it will rise and permanent separations from the subfloor generally follows. Furthermore, ordinary, non-waterproof felt allows water to penetrate to the subfloor, from above, in case the flooring becomes wet, if the flooring happens to contain open joints.

The object of the present invention is to make it possible successfully to use a composite flooring material of the type in which a layer of wood tiles is provided with a flexible backing membrane so that, with a membrane in the form of a single thickness or layer, the necessary strength and waterproofness is obtained, while permitting the moisture in the adhesive between the flooring and an impervious supporting foundation to be dissipated in a manner that insures proper setting of the adhesive and the achievement of a good bond, without danger of bringing about objectionable cupping or warping of the wood tiles.

Figure 2:
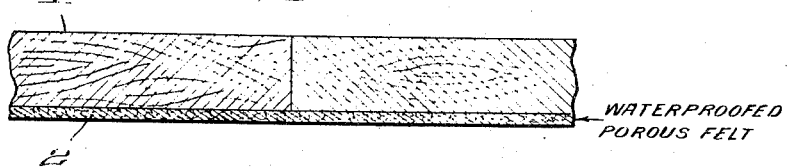

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a plan view of a fragment of a flooring panel or sheet embodying the present invention; and Fig. 2 is a section, on a much larger scale, through the panel at right angles to the plane of the latter, showing only a small fragment thereof.

Referring to the drawing, 1, 1 represent wood tiles which may be in the form of blocks, short boards or narrow strips mounted on a suitable flexible backing. The present invention is not concerned with the structural details or shapes of the tiles. The tiles may be secured to a backing membrane 2 by means of adhesive, staples or other fastenings. The backing membrane may be felt or other porous, fibrous material treated in such a manner that the individual fibers are coated with a waterproofing material, whereas the pores or interstices in the membrane are left open. When the membrane comprises one of the common felts, the waterproofing may be done while the material of the membrane is still in the form of wet pulp; asphalt, in the form of an emulsion, for example, being added to the watery mixture and each individual fiber becoming covered with a very light coating of the waterproofing substance. Then, when the pulp is transformed into sheet felt, in the usual way, the resulting product remains porous and yet has waterproof qualities not possessed by plain felt. Furthermore, the waterproofing of the individual fibers adds to the mechanical strength of the resulting sheet or membrane.

When my improved flooring is laid upon a subfloor covered with a layer of adhesive containing water or alcohol, the backing membrane is sufficiently resistant to the direct absorption of liquid, that the wood tiles cannot become objectionably damp on the under sides. The backing membrane absorbs water or alcohol vapors. However, the absorption of vapors by the membrane occurs at such a slow rate that no objectionable inequality in the moisture distribution in the wood tiles results. Therefore, if the subfloor is one which will absorb moisture in the form of liquids or vapors from the wet adhesive, the vapors are absorbed by both the backing membrane of the flooring and the subfloor. But, should the subfloor be relatively incapable of absorbing liquids or vapors from the adhesive, there is still no imprisonment of the liquid and vapors between the flooring and the subfloor, as would be the case if the backing membrane were of the saturated felt type; the moisture or solvent in the adhesive being taken up by the backing membrane of the flooring. Consequently, my improved flooring can be successfuly bonded to any type of floor, subfloor or other foundation, whether or not the latter be capable of readily absorbing liquids or vapors.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A flooring material composed of a layer of wood tiles overlying and secured to a flexible backing membrane, said backing membrane being formed of waterproofed fibers felted so as to leave the normal pores in the membrane open to permit vapors of water or alcohol to penetrate the same.

2. A flooring material composed of a layer of wood tiles overlying and cemented to a flexible backing membrane, said membrane being formed of fibers coated with waterproofing material and felted so as to leave the normal pores in the membrane open to permit the passage of vapors.

ARMIN ELMENDORF.